United States Patent [19]
Bonham

[11] Patent Number: 5,452,364
[45] Date of Patent: Sep. 19, 1995

[54] SYSTEM AND METHOD FOR MONITORING WILDLIFE

[76] Inventor: Douglas M. Bonham, 4907 221st St. SW., Mountlake Ter., Wash. 98043

[21] Appl. No.: 163,847

[22] Filed: Dec. 7, 1993

[51] Int. Cl.⁶ ............................................. H05K 5/00
[52] U.S. Cl. ..................................... 381/92; 381/155
[58] Field of Search .......................... 381/92, 155, 160; 367/125

[56] References Cited

U.S. PATENT DOCUMENTS

| | | | |
|---|---|---|---|
| 3,895,188 | 7/1975 | Ingraham | 381/155 |
| 4,037,052 | 7/1977 | Doi | 381/155 |
| 4,629,834 | 12/1986 | Waggoner et al. | 381/68.2 |
| 4,836,328 | 6/1989 | Ferralli | 381/160 |

OTHER PUBLICATIONS

P. U. Alkon, "Acoustic Biotelemetry for Wildlife Research: A Preliminary Test and Prospects," *Wildlife Soc. Bull.*, 14:193–196, 1986.
W. M. Schleidt "The Animal as a Sound Source," Int'l Conf. on Telemetry and Radio Tracking in Biology and Medicine (Univ. of Oxford 1979) Pergamon Press Ltd. 1980.

*Primary Examiner*—Stephen Brinich
*Attorney, Agent, or Firm*—David S. Goldenberg

[57] ABSTRACT

A system and method for conducting surveys of vocalizing wildlife by determining the direction species of wildlife that emit vocalizations is disclosed. The system includes a sound receiving unit (12) with a set of three microphones (14, 16, 18) for monitoring the vocalizations. The signals received by the microphones are supplied to an audio signal processing circuit (20) that produces a set of subtractive signals indicating the relative signal strength of the received signals and a digital signal representative of the period of the received vocalizations. The signals produced by the audio signal processing circuit are supplied to a central processing unit (22). The central processing unit calculates the frequency of the vocalization based digital signal representative of the period of the signal and based on a set of these signals determines the species that emitted the vocalizations. A angular detection circuit integral with the audio signal processing circuit determines the angular direction relative to the sound receiving unit of from where the vocalization originated based on the subtractive signals.

21 Claims, 13 Drawing Sheets

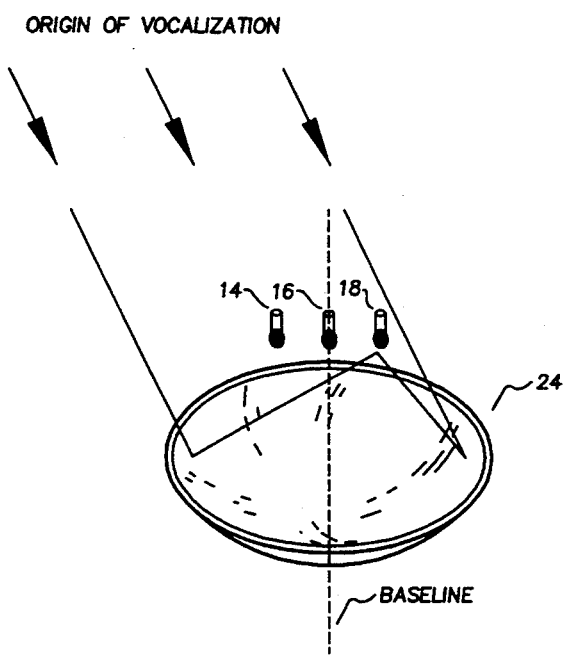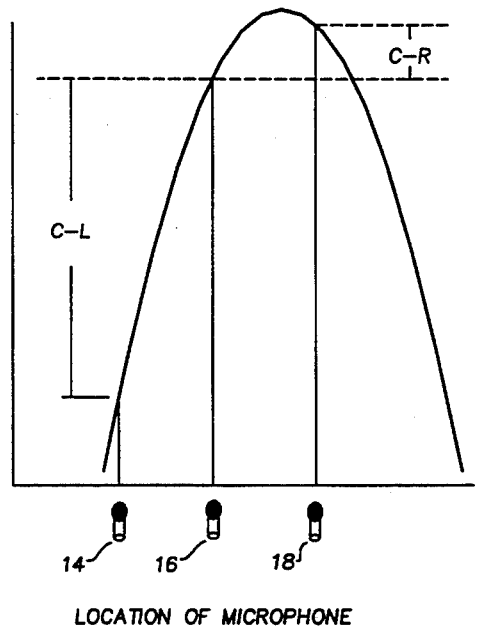
FIG. 5A
FIG. 5B

SYSTEM AND METHOD FOR MONITORING WILDLIFE

FIELD OF THE INVENTION

This invention relates generally to a system and method for monitoring the location of wildlife in a survey area and, more particularly, to a system and method for monitoring wildlife based on the sounds, the vocalizations produced by the wildlife.

BACKGROUND OF THE INVENTION

An important part of many environmental impact studies and other environmental analyses is the determination of the nature and quantity of wildlife in the area being studied. In order to perform population studies of many wildlife species, it is simply not enough to station a biologist or trained field technician in an area to monitor the wildlife being studied. This is because in many nature settings dense vegetation and/or inadequate light make it difficult for personnel to generate an accurate census of the wildlife. Moreover, the presence of survey personnel can disturb animal behavior and adversely affect survey results. Consequently, considerable effort has been devoted to developing other types of systems and methods to perform wildlife surveys.

Several types of electronic devices have been employed to aid in efforts to monitor wildlife. Some wildlife is monitored by capturing animals and attaching radio transmitters to their bodies. The signals emitted by the transmitters are monitored by one or more complementary receivers in order to determine the paths of the tracked animals. A disadvantage of the use of these transmitters is that they require the animal to be captured in order for transmitter to be harnessed to its body. This process of capturing animals so that they can be harnessed with a transmitter can be difficult, expensive, and dangerous. Scanning radars have been used to provide information on the location and velocity of airborne animals such as birds and small flying mammals. A limitation of these radars is that they have not proved particularly useful for locating animals located on the ground or perched in vegetation.

Owing to the inherent limitations of electronic monitoring devices, some wildlife studies are conducted by having trained personnel make audio surveys of the sounds, called vocalizations, made by wildlife within the study area. The vocalizations made by wildlife can provide information on the identity of its species, its age, gender, behavior, and home ranges. Wildlife which have been studied based on their vocalizations include species of birds, frogs, primates, wolves, coyotes, and elk. One limitation of such surveys is that they are inherently limited by a person's ability to hear, interpret, and remember sounds produced by the wildlife. Furthermore, as with the case of visual surveys, the presence of survey personnel can disturb animal behavior and subsequently affect survey results. Audio surveys, like visual surveys, can also be limited by the long hours and expense required to conduct thorough surveys.

There have also been some attempts to perform audio surveys by making recordings of the vocalizations made by the wildlife within a study area. An advantage of making these recordings is that once the recording equipment is in place, in can be left untended. This minimizes the human interference within the study site and reduces the field time personnel need to make the study. Another advantage of making these recordings is that they can be used to generate spectrographs of the vocalizations emitted by the wildlife. Trained personnel can then examine these spectrographs in order to determine the nature of the target wildlife that emitted the vocalizations that were captured by the recording apparatus. A disadvantage of many of these recordings though is that they only provide an indication that a particular species of wildlife is within the area being monitored, they do not provide an accurate indication of the location of the wildlife within the area. Thus, while such recording devices have proved useful tool for conducting wildlife survey, they are not without their own limitations.

SUMMARY OF THE INVENTION

This invention relates to a new and useful system and method for monitoring the presence of wildlife within a survey area. More specifically this invention relates to a wildlife survey system that monitors the vocalizations emitted by wildlife targets so as to produce an indication of their locations within a survey area. The system of this invention includes one or more sound receiving units. Each sound receiving unit includes a parabolic reflector designed to capture the sound waves of the vocalizations produced by the wildlife target. The sound receiving unit further includes at least three microphones. A first one of the microphones is mounted in the center of the reflector so that it is located at the focal point of the reflector. In one version of the invention, a second microphone is attached to the reflector to the left of the center microphone and a third microphone is attached to the reflector to the right of the center microphone. The signals produced by the microphones are applied to an audio signal processing circuit that produces a set of subtractive signals representative of the differences in signal strength between the signals produced by the center microphone and the offset left and right microphones. The subtractive signals are, in turn, used to generate an angular direction signal representative of the direction from which the vocalization originated. The audio signal processing unit also produces a digital format signal representative of the frequency of the vocalizations monitored by the sound recording unit. This signal is also supplied to the central processing unit.

When the system of this invention is used to perform a wildlife survey, the sound receiving unit monitors the vocalizations of the target animals. Upon receiving the vocalization signals from the sound recording unit, the audio signal processing unit generates subtractive signals and the digitized vocalization signal. Either the central processing unit or a separate digital signal processing circuit associated with the audio signal processing circuit then generates the angular direction signals for the received vocalizations. The central processing unit uses these signals for producing both a frequency spectrograph or profile of the monitored vocalization that includes an indication of the direction from which the vocalization originated.

An advantage of the wildlife monitoring system of this invention is that it produces both a frequency profile of the vocalization it monitors and indication of the direction from which the vocalization originated. When the system is provided with two sound receiving units, the central processing unit is configured to generate an indication of the location of the target when it emitted the vocalization. Thus, the system of this invention provides a convenient means to determine the location of particular target animal within a survey area without having to provide the constant presence of field personnel. Another advantage of the system of this invention is that by adjusting the positions of the sound receiving units, and the sensitivity of the audio signal processing circuits, the system can be used to monitor the presence of wildlife that live on the ground such as wolves, or other mammals, and species that live above ground level such as birds. Thus, the wildlife monitoring system of this invention can take the place of multiple monitoring systems that by their very nature can only be used to monitor a select subset of wildlife. Still another advantage of the wildlife monitoring system is that it can be used to study the population and/or habits of a species within a wildlife study area without first having to capture members of the species and provide them with radio transmitters.

BRIEF DESCRIPTION OF THE DRAWINGS

This invention is pointed out with particularity in the claims. The above and further advantages of this invention may be better understood by referring to the following description taken in conjunction with the drawings in which:

FIGS. 3A, 4A, and 5A are a diagrammatic view of how sound waves of a vocalization are monitored by the sound receiving unit of this invention;

FIGS. 3B, 4B, and 5B are graphs illustrating the difference in signal strength between the microphones incorporated in the sound recording unit as they monitored the sound waves depicted in FIGS. 3A, 4A, and 5A respectively;

BEST MODE FOR CARRYING OUT THE INVENTION

Figure 1:
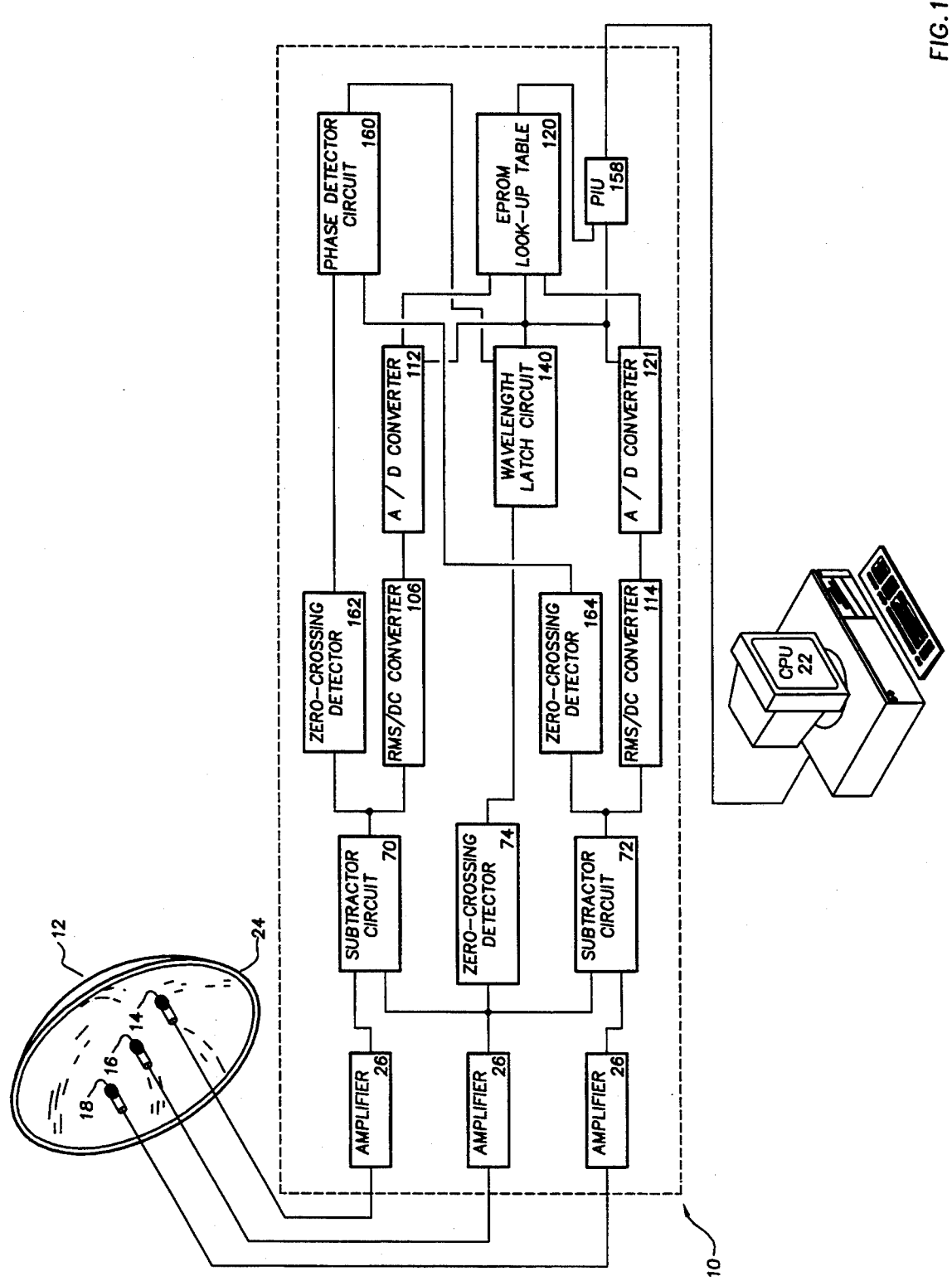
FIG. 1 is a block diagram of the basic components of the wildlife monitoring system of this invention.

FIG. 1 depicts the basic wildlife monitoring system 10 of this invention. The system 10 includes a sound receiving unit 12 with a set of microphones 14, 16, and 18 that are used to detect the sounds, or vocalizations, emitted by the wildlife being studied in the survey area. The signals produced by the microphones 14, 16, and 18 are applied to an audio signal processing circuit 20. The audio signal processing circuit 20 produces a digitized measurement of the wavelengths of sounds detected by the center microphone 16 and a digitized value representing the angular direction from which the vocalization originated.

The digitized values representing wavelengths and direction of the vocalization are applied to a central processing unit 22 such as is contained within a personal computer. Central processing unit 22 stores and analyzes the digitized values of wavelengths with known patterns of wavelengths to identify the species of the target that emitted the vocalization. The central processing unit 22 also generates a spectrograph which graphically depicts patterns of wavelengths over time. Integral with the frequency spectrograph is an angular detection graph of the direction of from which the vocalization originated. The spectrograph of the vocalization and the associated angular direction graph allow persons to quickly identify the species that emitted the vocalization and the direction from which it originated.

Sound receiving unit 12 includes a parabolic reflector 24 formed from material that reflects sound waves. Microphone 16, the center microphone, is mounted to the parabolic reflector 24 so that its sound sensitive transducing element is located at the focal point of the parabolic reflector 24. Microphone 14, hereinafter the right microphone, is mounted to the right side of the center microphone 16. Microphone 18, hereinafter the left microphone, is mounted to the left side of the center microphone 16. Microphones 14 and 18 are mounted to the parabolic reflector 24 so as to be spaced an equal distance apart from the center microphone 16 and are further mounted to the parabolic reflector 24 so that their sound sensitive transducing elements are located in a line that extends perpendicular to the line that extends between the focal point of the reflector-and the center point of the parabolic reflector 24, hereinafter the reflector baseline.

Figure 2A:
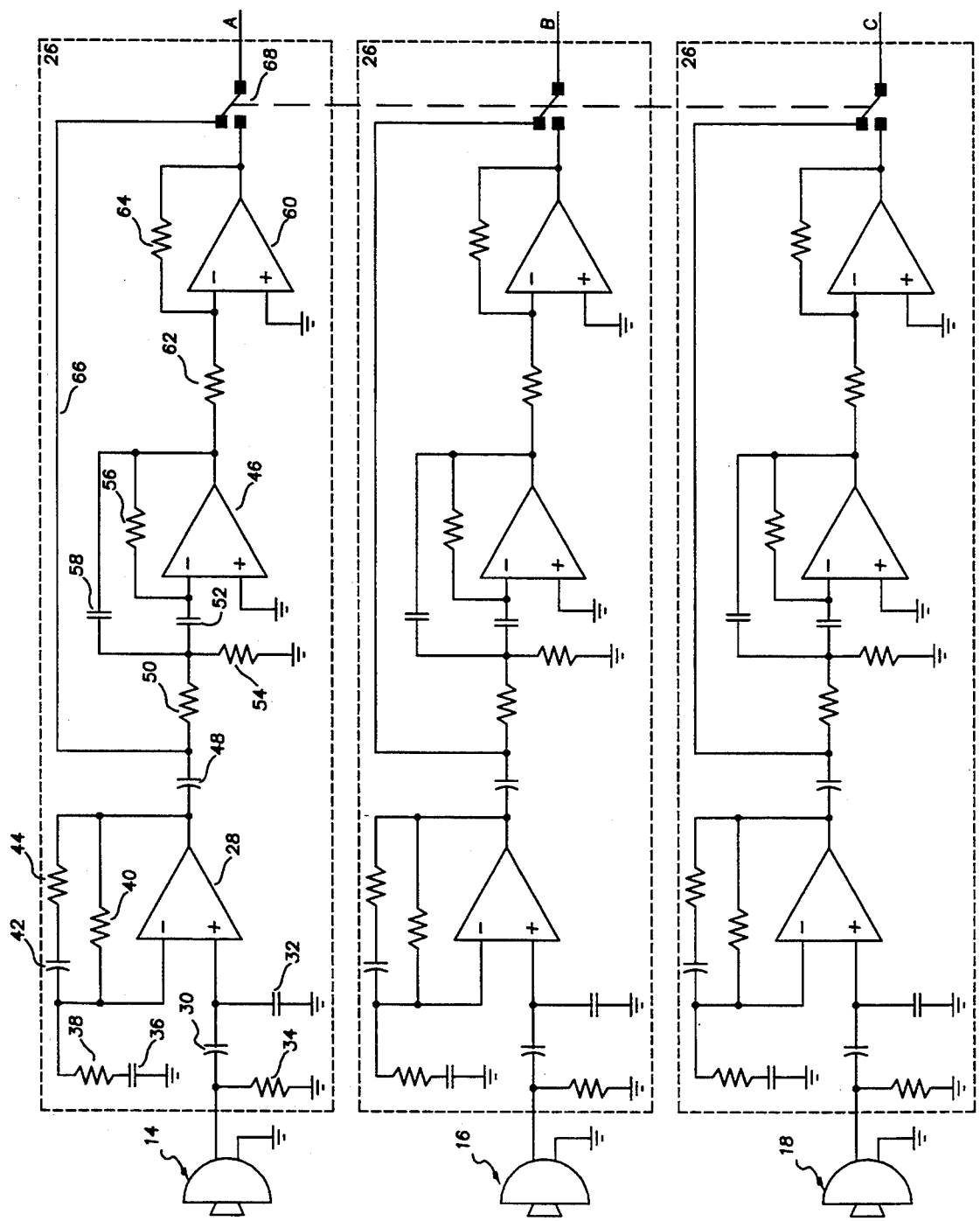
FIGS. 2A, 2B, 2C, and 2D together represent a schematic diagram of the basic audio signal processing circuit of the wildlife monitoring system of this invention.

FIGS. 2A, 2B, 2C, and 2D form a schematic diagram of the audio signal processing circuit 20. The circuit 20 includes a set of three identical amplifiers 26 each of which amplifies the signals produced by one of the microphones 14, 16, or 18. Each amplifier 26, only one of which is described in detail, includes a first operational amplifier 28 that serves as a preamplifier of the signals produced by the associated microphone. As depicted in FIG. 2A, the output signal from the right microphone 14 is applied to the non-inverting input of amplifier 28 through a DC blocking capacitor 30. A capacitor 32 is connected at one end to the junction between capacitor 30 and amplifier 28 and its opposite end to ground. The size of capacitor 32 is chosen to filter unwanted high frequency noise to ground, that is signals above approximately 100 kHz to ground. Resistor 34 is connected between the output of microphone 14 and ground. Resistor 34 provides input resistance to amplifier 28. The inverting input to amplifier 28 is connected to ground first through resistor 38 and then through capacitor 36. Feedback resistance for amplifier 28 is provided in part by resistor 40 that is connected between the output and inverting input of the amplifier. In one version of the invention, resistors 34 and 40 are selected so that amplifier 28 has a gain of 100. The inverting input to amplifier 28 is connected to ground first through resistor 38 and then through capacitor 36. The non-inverting input of the amplifier is also connected to its output through a series-connected capacitor 42 and a resistor 44. Components 36, 38, 42, and 44 are chosen to enhance the amplification of typical audio frequencies, that is frequencies between 50 Hz and 20,000 Hz.

The output signal from amplifier 28 is applied to a second operational amplifier, amplifier 46, that is configured to function as a bandpass filter to pass signals within the general frequency range of the vocalizations produced by the target animals being studied. Specifically, the output signal from amplifier 28 is applied to amplifier 46 through a DC blocking capacitor 48. The signal passing through capacitor 48 is applied to the inverting input of amplifier 46 through a series connection consisting of a resistor 50 and a capacitor 52, the latter component being directly tied to the inverting input of the amplifier. A resistor 54 is connected between the junction of resistor 50 and capacitor 52 and ground. A first feedback loop across amplifier 46 is established by a resistor 56 connected between the output of the amplifier and the inverting input. A second feedback loop across amplifier 46 is established by a capacitor 58 connected between the output of the amplifier and the junction between resistor 50 and capacitor 52. The non-inverting input of the amplifier 46 is tied directly to ground. Resistors 54 and 56 and capacitors 52 and 58 are chosen so that in combination with amplifier 46 they form a bandpass filter that passes signals centered around the primary frequency of the vocalizations of the wildlife species being studied. For example, one species of owl is found to emit vocalizations centered around 670 Hz. Operational amplifier 46 and the associated components are selected to pass signals centered around 670 Hz±50 Hz.

In some forms of the invention, capacitors 52 and/or 68 can be in the form of variable capacitors and or resistors 54 and/or 56 can be in the form of variable resistors to allow an operator to adjust the system 10 so that it is frequency selective to the vocalizations emitted by one or more different target species. In still other versions of the invention, frequency selection is accomplished by substituting a graphic equalizer for operational amplifier 46 and the components with which it is associated. The incorporation of the graphic equalizer, or other frequency selective device into the system provides an alternative means for selectively filtering the signals processed by the system so that it only processes signals that have frequencies that match those of the vocalizations of the target species of interest.

The output from bandpass amplifier 46 is applied to an operational amplifier 60 that is configured as an inverting amplifier. The output signal from amplifier 46 is applied to the inverting input of amplifier 60 through a resistor 62. A resistor 64 connected at one end to the output of amplifier 60 and to the other end to its inverting input establishes a feedback loop across the amplifier. The non-inverting input of amplifier 60 is tied directly to ground. In one version of the invention, resistors 62 and 64 are selected so that amplifier 60 provides a gain of 10.

As depicted in FIG. 2A, a bypass conductor 66 may be provided across amplifiers 46 and 60 to effectively remove their filtering and signal amplification from the circuit. Bypass conductor 66 is connected at one end to the junction between DC blocking capacitor 48 and resistor 50. The opposite end of conductor 66 is connected to a double-pole, triple-throw switch 68 to which the output of amplifier 60 is also connected. By the selective positioning of switch 68, personnel controlling the system 10 can effectively bypass amplifiers 46 and 60 to allow a broad frequency range of signals to be processed by the other components of the system 10.

Returning to FIG. 1, it can be seen that the amplified and filtered signals produced by amplifiers 26 are applied to a pair of subtractor circuits 70 and 72 and to a zero-crossing detector 74. Specifically, the amplified and filtered signals produced by the right microphone 14 and by the center microphone 16 are applied to subtractor circuit 70 which produces a signal representative of the difference between these two signals. The amplified and filtered signals produced by the left microphone 18 and the center microphone 16 are applied to subtractor circuit 72, which is identical to subtractor circuit 70, to produce a signal representative of the difference between these two signals.

The amplified and filtered signal produced by the center microphone 16 is also applied to the zero-crossing detector 74 to produce a rectangular wave of the same frequency as the sound detected by said microphone. The rectangular wave is used by the system 10 to measure the wavelengths of the detected sounds.

Figure 2B:
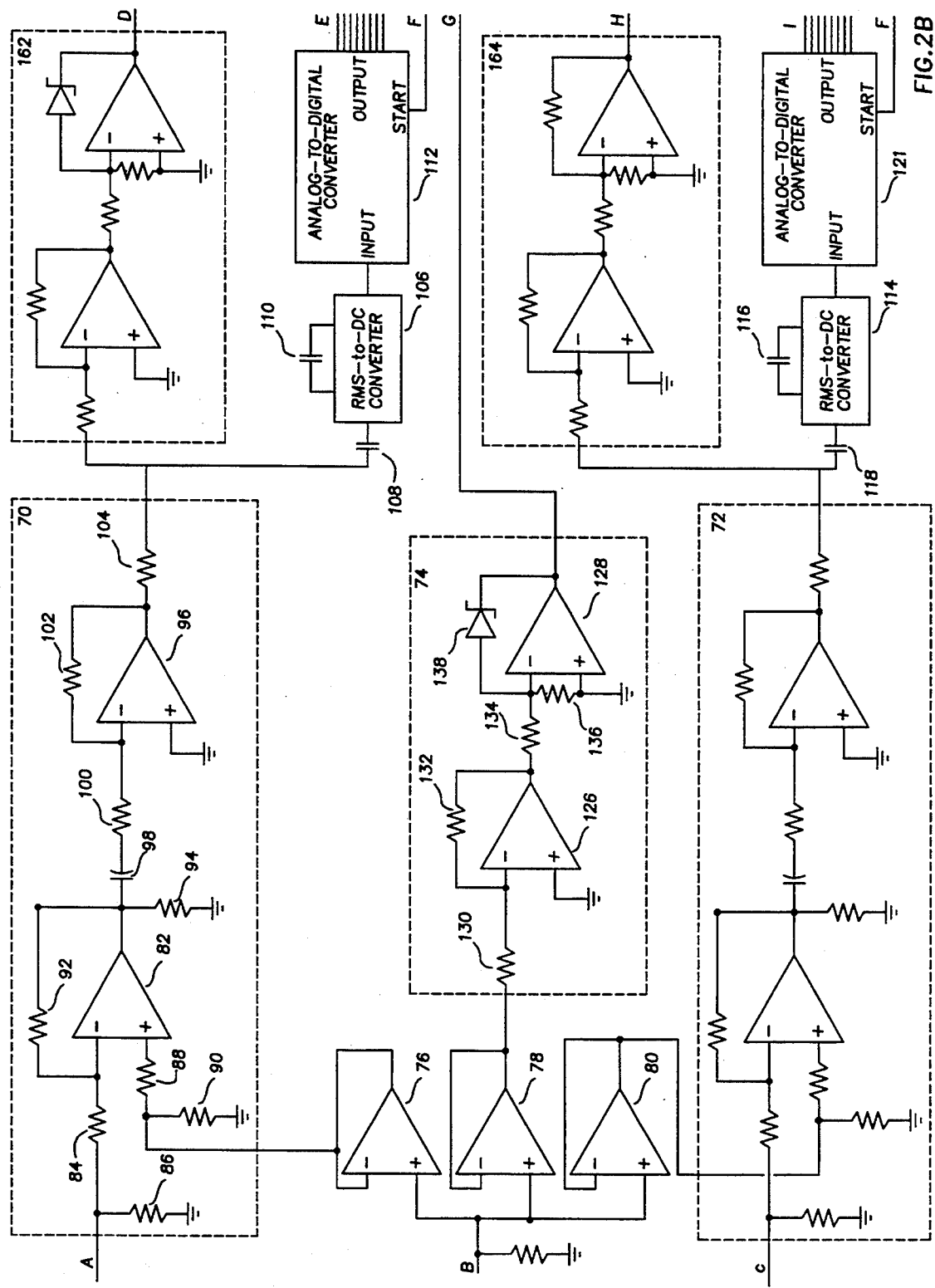

As depicted in FIG. 2B, the signal produced by the amplifier 26 to which the center microphone 16 is connected is initially applied to the non-inverting inputs of three separate operational amplifiers 76, 78, and 80. The output signals from each of these amplifiers is connected directly to their inverting inputs so that these amplifiers function as unity gain high impedance buffers between the amplifier 26 and subtractor circuits 70 and 72 and the zero-crossing detector 74.

Subtractor circuit 70 includes an operational amplifier 82 that produces a signal representative of the difference between the audio signal produced by the center microphone 16 and the audio signal produced by the right microphone 14, hereinafter the C-R signal. Specifically, the signal produced by the amplifier 26 with which the right microphone 14 is associated is applied to the inverting input of amplifier 82 through a resistor 84. This circuit also includes a resistor 86 tied between the output of amplifier 26 and ground to establish a stable output impedance for amplifier 26. The output signal from buffer amplifier 76 is applied to the non-inverting input of amplifier 82 through a resistor 88. A resistor 90 is tied between the output of buffer amplifier 76 and ground to establish a stable output impedance for that amplifier. A feedback loop is established between the output of amplifier 82 and its inverting input by a resistor 92. A resistor 94 is tied between the output of amplifier 82 and ground. It should be noted that the values of resistors 84, 86, 88, and 90 are all the same in order simplify the comparison of signal strengths.

The C-R signal produced by amplifier 82 is applied to an operational amplifier 96 through DC-blocking capacitor 98 and resistor 100. Operational amplifier 96 is configured as an inverting amplifier which provides an appropriate amount of gain so that the C-R signal can be applied to an RMS-to-DC conversion integrated circuit 106. Specifically, the output from amplifier 82 is applied to amplifier 96 first through a DC-blocking capacitor 98 and then through resistor 100. Resistor 102 provides feedback for amplifier 96 between its output and non-inverting input. In one version of the invention, resistors 100 and 102 are selected so that amplifier 96 has a gain of 22.

Output from subtractor circuit 70 is applied to RMS-to-DC converter 106 through DC-blocking capacitor 108. A filter capacitor 110 is connected across the capacitor pin and the positive voltage supply pin of the converter 106 to provide an appropriate tradeoff between smoothing the converter output and allowing the circuit to respond to changes in the strength of the C-R signal. The output of RMS-to-DC converter 106 is a varying level DC signal which is proportional to the strength of the C-R signal. The output of RMS-to-DC converter 106 is applied to an analog-to-digital converter 112.

Subtractor circuit 72 is identical in configuration to subtractor circuit 70. Subtractor circuit 72 produces a signal representative of the difference between the audio signal produced by the center microphone 16 and the audio signal produced by the left microphone 18, hereinafter referred to as the C-L signal.

The C-L signal produced by subtractor circuit 72 is applied to RMS-to-DC converter 114. Both of the RMS-to-DC converters 106 and 114 use the same size filter capacitors 110 and 116, and the same size DC-blocking capacitors 108 and 118. The output from RMS-to-DC converter 114 is applied to analog-to-digital converter 121. Digitized values of C-R and C-L, from the outputs of converters 112 and 121, respectively, are applied to address pins on an EPROM 122 illustrated in FIG. 2D. The EPROM 122 forms a portion of the EPROM look-up table 120 depicted in FIG. 1.

EPROM 122 is programmed with angular direction values that represent the apparent angle left or right from the reflector base line from which the vocalization baseline originated. The digitized values of C-R and C-L combine to form an internal EPROM address at which the apparent angular direction value for the vocalization monitored by the system 10 is stored. FIGS. 3A through 4B illustrate the relationship between the C-R and C-L signals and the angular direction values.

Figure 3A:
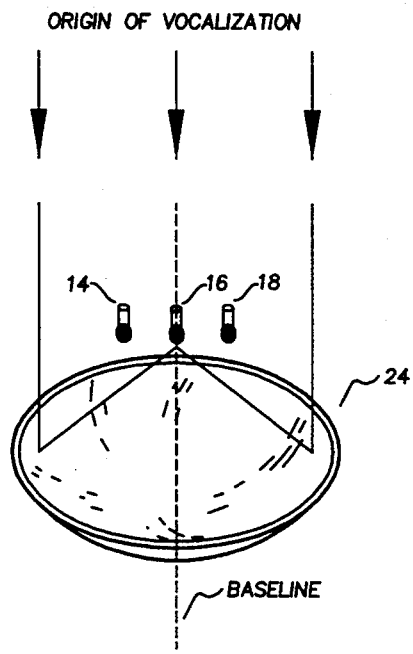

As seen diagrammatically in FIG. 3A, the reflector baseline is defined to be the line extending between the center microphone 16 and the center of the parabolic reflector 24. A sound source is considered to be located at 0 degrees when it is located along the reflector baseline.

Figure 3B:
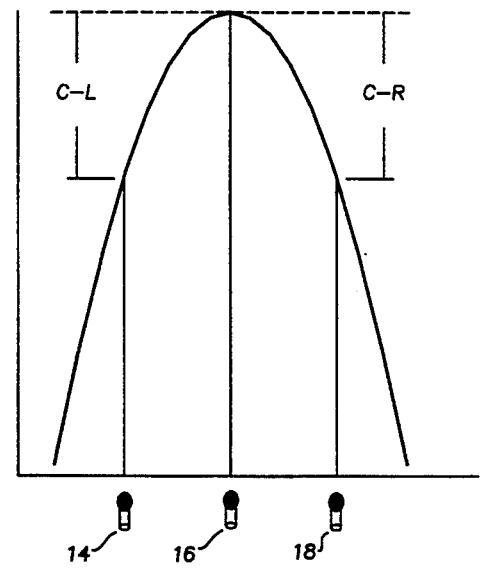

FIGS. 3A and 3B depict a condition when a sound source is located at 0 degrees with respect to the reflector baseline. As represented by FIG. 3B, when the monitored sound originates from 0 degrees, the sound level monitored by the center microphone 16 will be higher than the sound levels monitored by the right or left microphones 14 and 18. The sound levels monitored by the right and left microphones 14 and 18 will be of equal strength. Thus, in this instance the C-R and C-L signals will be of equal value. EPROM 120, is thus with a value of 0 degrees at addresses for which pins A0 through A7 (the digitized value of C-R) are equal to pins A8 through A15 (the digitized value of C-L).

Figure 4A:
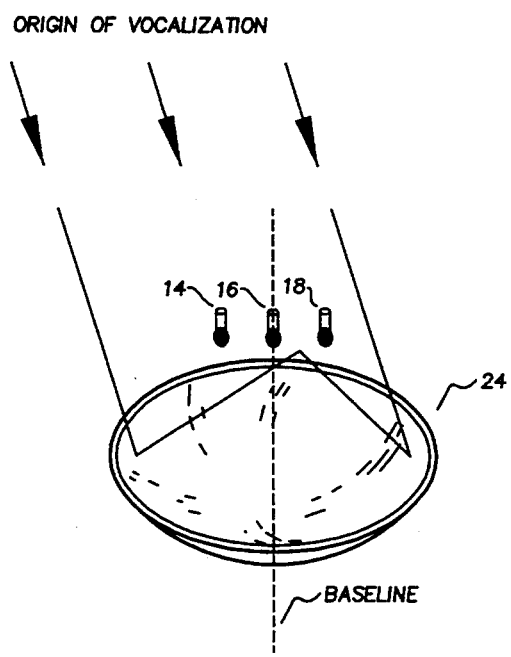
Figure 4B:
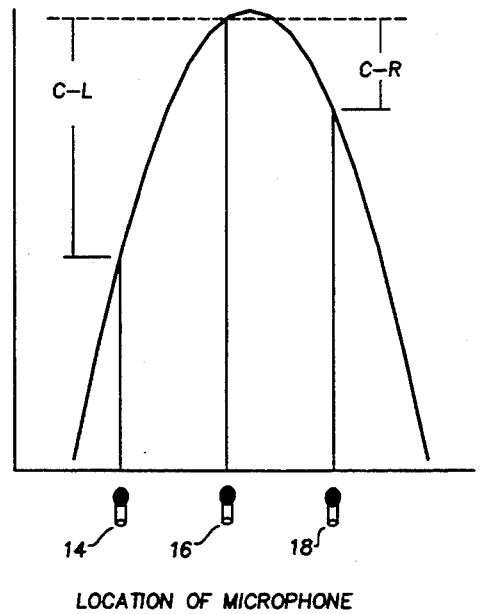

FIGS. 4A and 4B depict a condition which occurs when a sound source is located approximately 20 degrees to the left of the reflector baseline. As seen by FIG. 4A when the monitored vocalization originated from this position, while the strongest was monitored by center microphone 16, the sound level monitored by right microphone 16 is higher than the sound level monitored by left microphone 18. Thus, in this instance, C-R is less than C-L. EPROM 120 is programmed with a value of 20 degrees at the address corresponding to the appropriate values of C-R and C-L.

In one version of the invention, EPROM 122 is programmed with apparent angular direction values determined empirically by placing a test tone generator at known locations and measuring the digitized values of C-R and C-L. The apparent angular direction values retrieved from EPROM 122 are then supplied to a second EPROM, EPROM 177, which, as discussed hereinafter, contains a set of adjusted angular direction values.

Returning to FIG. 2B, the circuitry designed to measure the wavelengths of sounds monitored by the center microphone 16 will now be described in detail. The amplified and filtered signal from center microphone 16 is buffered by amplifier 78. The output from buffering amplifier 78 is applied to the zero-crossing detector 74. The zero-crossing detector 74 consists of two operational amplifiers 126 and 128 which are configured to produce a five-volt peak-to-peak rectangular wave with the same wavelength as the monitored sound wave.

Specifically, operational amplifier 126 is configured as a high-gain inverting amplifier. The input signal to amplifier 126 is applied from the output of a resistor 130 that is connected to the inverting input of amplifier 126. A feedback resistor 132 is connected between the output of amplifier 126 and its inverting input. The non-inverting input of amplifier 126 is tied directly to ground. Resistors 130 and 132 are chosen to provide amplifier 126 with a gain of 100. This relatively high gain is provided to ensure that even weak audio signals form well defined zero-crossing points which can be processed by subsequent components.

The output from operational amplifier 126 is applied to the inverting input of operational amplifier 128 through resistor 134. A resistor 136 is tied between both inputs to amplifier 128 and the non-inverting input to the amplifier 128 is tied to ground. A five-volt zener diode 138 clips both the positive and negative peaks of the signal to produce a five-volt peak-to-peak rectangular wave that has period that corresponds to that of vocalization monitored by the system 10.

Figure 2C:
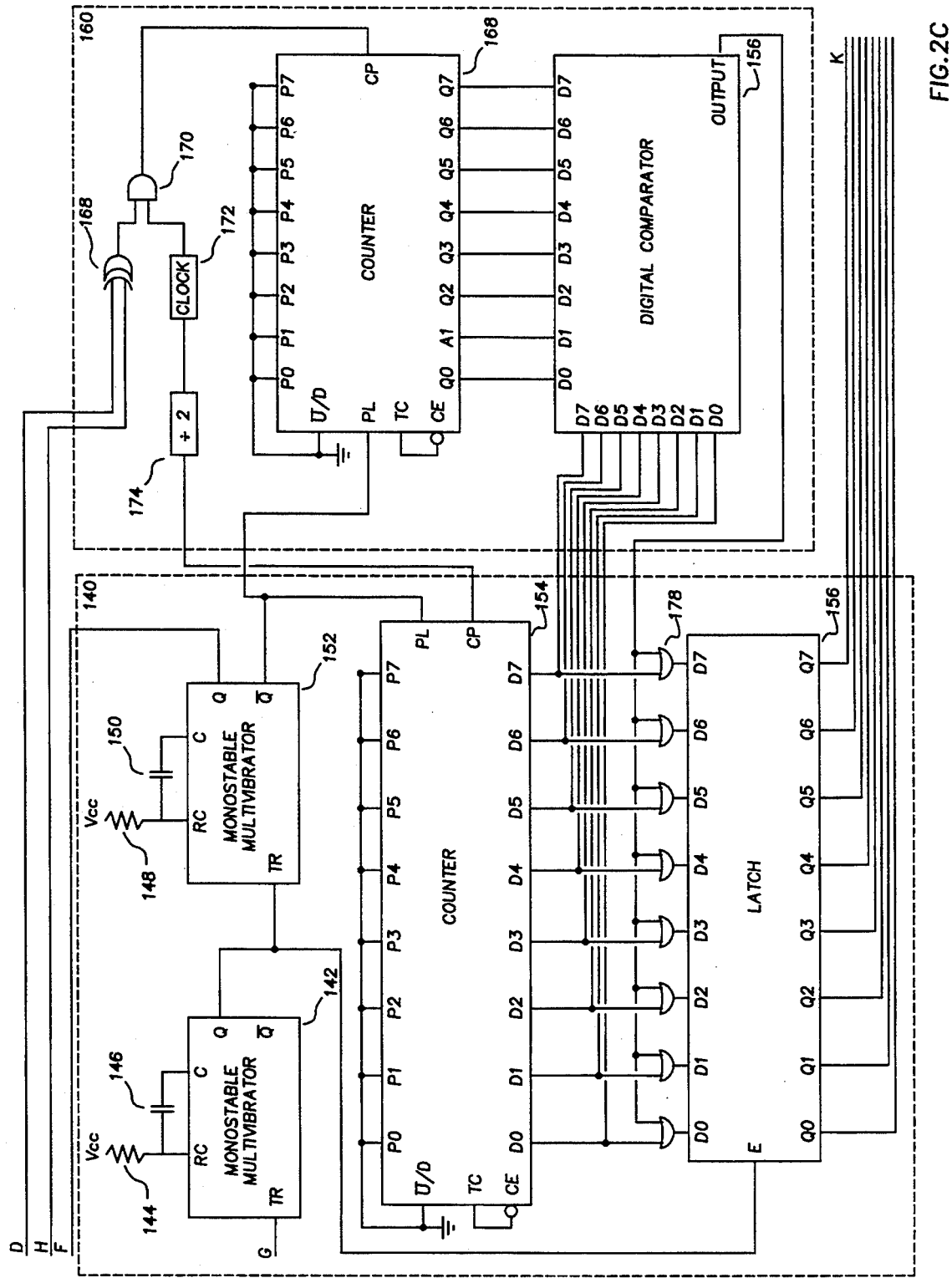
Figure 2D:
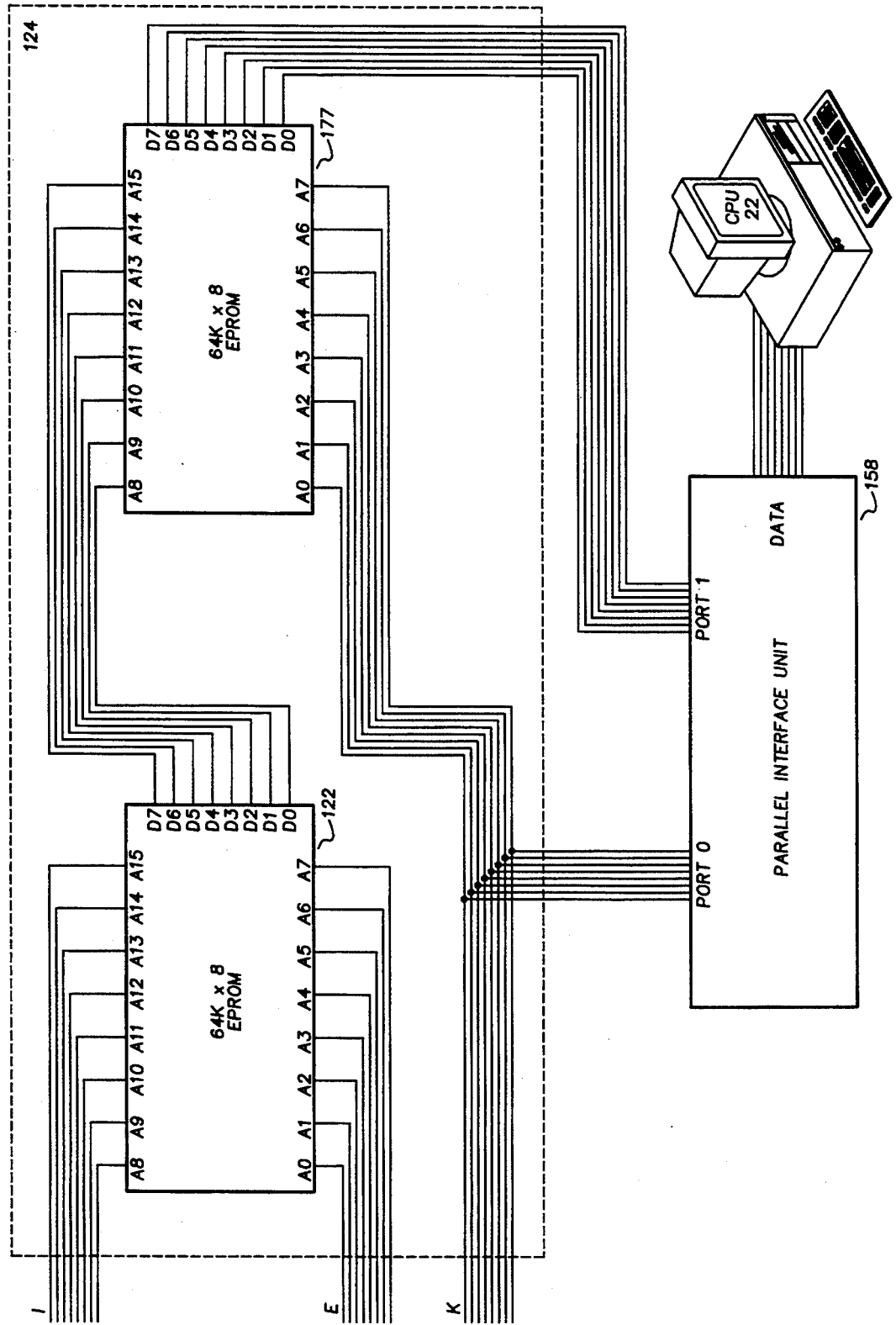

The output from the zero-crossing detector 74 is applied to the wavelength latch circuit 140. With reference now to FIG. 2C, it can be seen specifically, that the output from the zero-crossing detector 74 is applied to the trigger of monostable multivibrator 142. The monostable multivibrator 142 is configured to generate a one-shot pulse each time the signal from the zero crossing detector undergoes a positive-to-negative transition. A capacitor 146 connected across the appropriate control pins of the multivibrator 142 and a resistor 144 connected between the capacitor and ground control the duration of the pulse. In one version of the invention resistor 144 and capacitor 146 are chosen to produce a pulse of 0.1 MS duration.

The output pulse generated by multivibrator 142 is applied to a latch 156 to control the storage of the elapsed audio signal wavelength time read off a counter 154. The output signals from the counter 154 are applied to the latch 158 through a set of OR gates 178. The wavelength period elapsed time monitored by the counter is based on a set of clock pulses generated by clock 172. The clock pulses generated by clock 170 are actually applied to counter 154 through a divide-by-two flip-flop 174 for purposes that will be clear hereinafter. After the counter elapsed time is latched, the counter is zeroed by a signal from a second multivibrator, multivibrator 152. Specifically, multivibrator 152 is connected to receive the output pulse from multivibrator 142 and, in response, generates its own one-shot pulse. A resistor 148 and capacitor 150 are connected to multivibrator 152 to cause it to generate output pulses that have the same duration as the pulses generated by multivibrator 142. The output pulses generated by multivibrator 152 are supplied to the counter to reset it after its stored elapsed time value has been latched.

In the depicted version of the invention, the terminal count pin of counter 154 is tied to the count enable pin. This configuration prevents counter 154 from cycling back to zero after having reached the maximum eight-bit count. If the counter 154 were allowed to cycle to zero and continue to count it would result erroneous counts for wavelengths that are longer than can be counted by an eight-bit counter. When counter 154 is configured as depicted in FIG. 2C, when long wavelengths are encountered or when there is no sound detected at all, the count will stop at the highest eight-bit count and hold that value. This condition will continue until the next sound wave resumes the counting process at zero.

The count stored in the latch 154 is supplied to the central processing unit 22 through one port in a parallel interface unit 158. The latched count is also supplied to an EPROM 177 integral with the EPROM look up table 120. The latched count value serves as one-half the address of a location in EPROM 177 where an adjusted angular direction is stored. The other half of the EPROM address is the apparent angular direction signal supplied from EPROM 122. The adjusted angular address values stored in EPROM 177 are angular address values that compensate for variations in the apparent angular address values based on the frequency of the monitored vocalization. These variations can occur because of differences in frequency response by the microphones 14–18, the parabolic reflector 24, and/or the audio signal processing circuitry. The adjusted angular direction values stored in EPROM 177 are, in one version of the invention, based on empirical calibration of the monitoring system 10 of this invention. The adjusted angular direction value retrieved from EPROM 177 as an output signal is applied to the central processing unit 22 through a second port on the PIU 158.

In addition to initializing the count, the output pulse from monostable multivibrator 152 is also connected to the start pins on analog-to-digital converters 112 and 120. The received initiates the analog-to-digital conversion of the C-L and C-R signals.

The audio signal processing circuit 20 also includes a phase detector circuit 160 (FIG. 1) that inhibits subsequent processing of the received vocalization signals in the event the C-R and C-L signals are out of phase. As seen by FIGS. 5A and 5B this event can occur when the monitored vocalization originates from an angle significantly offset from the baseline of the reflector 24. As seen in the sound level plot of FIG. 5B, when the direction of origin of the vocalization is significantly offset to the left of the reflector baseline, C-L will have a positive value and C-R will have a negative value. In other words the C-R and C-L values would be out-of-phase with each other. If the audio signal processing circuit 20 were then to generate angular direction signals based on the out-of-phase C-R and C-L signals they would be incorrect since the stored angular direction values are based on the measurements made when the signals are in-phase. Moreover, the rejection of such signals for addition processing has the additional advantage of eliminating some of the unwanted background noise which might otherwise appear in the final output data from the system 10.

Phase detect circuit 160 as best seen by reference to FIGS. 2B and 2C, includes a pair of zero-crossing detectors 162 and 164. Zero-crossing detector 162 produces a high or low digital signal based on the positive/negative magnitude of the C-R. Zero-crossing detector 164 produces a digital signal representative of the positive/negative magnitude of C-L signal. The structure and operation of zero-crossing detectors 162 and 164 is substantially identical to the structure of previously described zero-crossing detector 74. The output signals from zero-crossing detectors 162 and 164 are five-volt peak-to-peak rectangular waves with the same wavelengths as the C-R and C-L signals respectively.

The output signals from zero crossing detectors 162 and 164 are applied to an exclusive-OR gate 168. The exclusive-OR gate asserts a high signal whenever the C-R and C-L signals are out of phase. Due to the less than perfect form of the sound waves that comprise a vocalization, the microphones, and the signal processing circuitry, the C-L and C-R signals are, however, typically unlikely to be entirely in-phase or entirely out-of-phase. The remainder of phase detect circuit 160 determines whether the C-L and C-R signals are more than 50 percent out-of-phase with respect to each other.

The output signal from the exclusive-OR gate 168 is applied to one input of an AND gate 170. The other input to AND gate 170 is the clock pulse signal from clock 172. The output from the AND gate 170 is applied to a counter 168. Since the counter 168 only receives the clock pulses when the C-L and C-R signals are out-of-phase, the counter maintains a total elapsed count of the time the C-L and C-R signals are out-of-phase.

A comparator 176 receives both the total elapsed count representative of the period of the sound wave from counter 154 and the out-of-phase elapsed count from counter 168. Comparator 176 compares the time period of the received sound wave to the total time the C-R and C-L signals measured during the wave were out of phase. Since the clock signal that advances counter 154 is at one-half frequency of the signal that advances counter 176, comparator 176 produces an indication of whether or not the C-R and C-L signals are out-of-phase for more then one-half the total time period of the measured sound wave. The output signal from comparator 176 is applied to the OR gates 178 through which the output signal from counter 154 is applied to latch 156. Thus, in the event the C-R and C-L signals are out-of-phase for greater than 50 percent of the total time period of the sound wave of the monitored vocalization, a digital high signal is applied by comparator 176 to all of the OR gates 178. The OR gates 178 applied digital high signals to the inputs of the latch 156. When the latch 156 is read in this state its output signal is hexadecimal FF. This is the value that is applied to the central processing unit 22 through the PIU 158. It should also be understood that hexadecimal FF is also the input applied to latch 158 whenever the elapsed time maintained by counter 154 reaches its terminal count.

The output pulse produced by multivibrator 152 is applied to counter 168. Thus, after the elapsed time period for one sound wave is stored in latch 156, the pulse produced by multivibrator 152 resets both counters 154 and 156.

Figure 6:
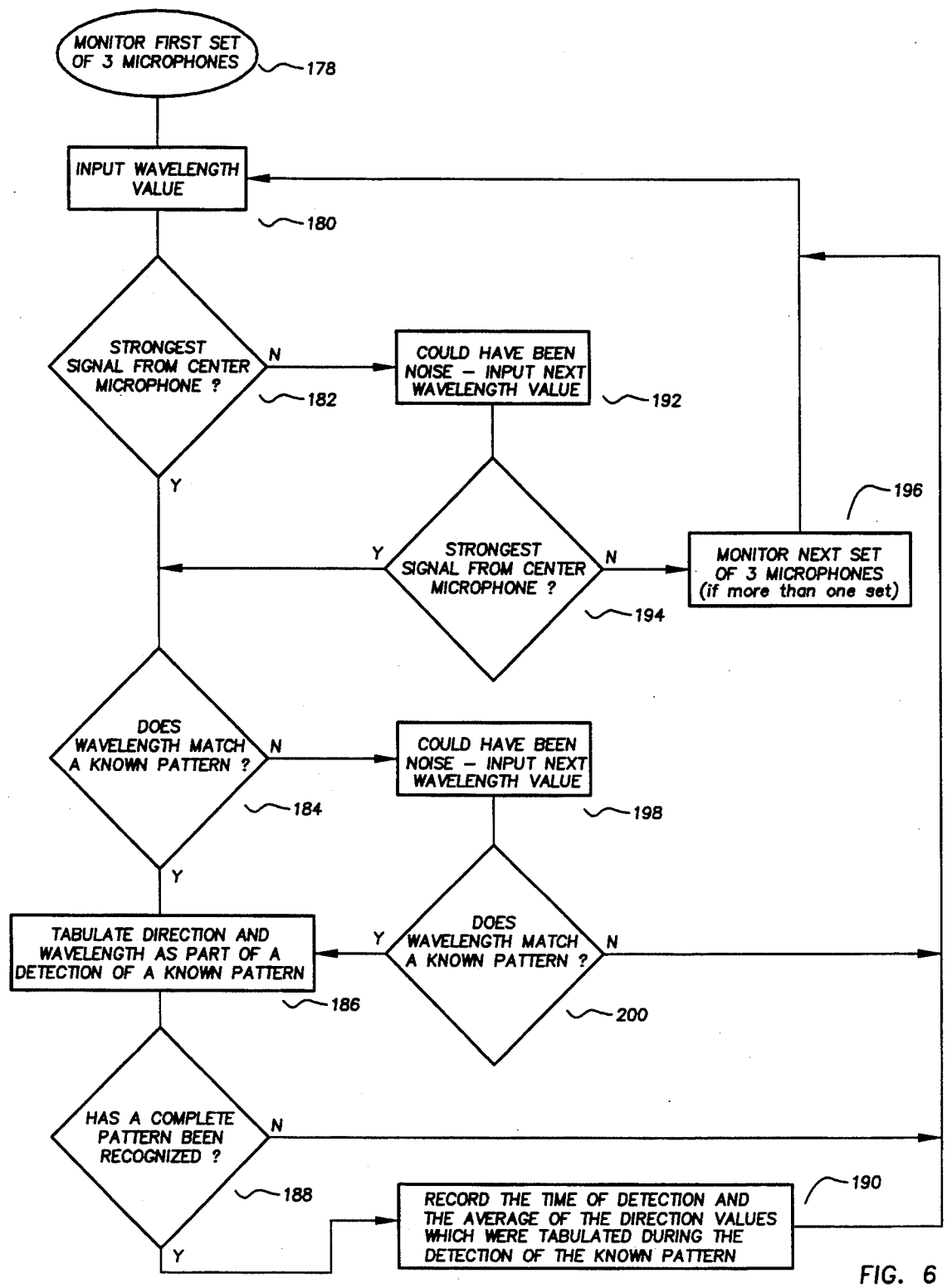
FIG. 6 is a block diagram illustrating the signal processing steps performed by the wildlife monitoring system of this invention.

FIG. 6 depicts the basic processing steps performed by the system 10 in order to generate a tabular indication of the species of the target monitored by the system as well as an indication of the location of the target. As depicted by step 178 the sound receiving unit 12 continuously monitors the survey area for sound waves that might be a vocalization from the target animal being studied Once a set of sound waves are monitored, the individual sound waves are digitized by the audio signal processing circuit 20 and forwarded to the central processing unit 22 as represented by step 180. Specifically, in step 180, both the digitized representation of the period of an individual sound wave as well as the adjusted angular direction value for the wave are supplied to the central processing unit 22. The central processing unit stores the adjusted angular direction value for the wave for later processing. The central processing unit then determines if the sound wave is one that can be further processed by determining if the wavelength period signal is equal to hexadecimal FF as represented by step 182. If the wavelength period signal is equal to hexadecimal FF the signal is considered unprocessable either because it is of too long a period (at a frequency well below normal animal vocalizations) or originated at a point well to the left or right of the reflector baseline, (the C-R and C-L signals are out of phase.) If this is the case, central processing unit 22 discards the stored angular direction value, as represented by step 183 and ceases execution of the species recognition process. Central processing unit 22 then returns to the quiescent state until the next set of signals are received.

If the wavelength period signal is a value other than hexadecimal FF, central processing unit 22 then determines if the signal is one of interest for the species being surveyed. This process starts by making an initial determination if the period of the wavelength is within the range of sound wave periods for the species being surveyed as represented by step 184. For example, if the system is being used to monitor the owl species that vocalizes as 670 Hz, ±50 Hz, central processing unit 22 is configured to determine if the received sound wave had a period between 1.39 and 1.61 mS, the normal range of periods of the sound waves for the owl. If the system is configured to monitor a second species, it would also make a determination to see if the period of the sound wave was within the normal expected range for that species. For example, some thrushes emit vocalizations at a range of frequencies between 3200 and 3500 Hz. When configured to monitor these birds, central processing unit 22 reviews the period of the received sound wave to determine if it is between 313 and 286 $\mu$S. If the period of the received vocalization is not within the range of periods for the species being monitored, the central processing unit discards the period data and the associated angular direction data, as represented by step 186, and waits until the next sound wave signal is received.

If the data indicates that the received sound wave fell within the spectrum of the periods of interest, the time the signal was recorded, as well as its associated angular direction value, are stored in a file as represented by step 187. Then, as represented by step 188, central processing unit 22 determines if the sound wave is part of the vocalization of a species of interest.

One such way this process is performed by evaluating the received sound wave to determine if it generally corresponds to a template representative of the vocalizations of the species. For example, one species of owl tends to emit a general constant tone vocalization. If the initial determination in step 184 is that the sound wave was within the expected range of period for that owl, central processing unit 22, determines if the immediate subsequently recorded sound waves had the same general period. This determination is made by reference to the look-up table to evaluate whether or not the recorded sound waves all have the same general period. Other species, such as thrushes, emit vocalizations that vary in frequency over time. Central processing unit 22 determines if the received sound waves monitor the known vocalization patterns for these species by determining if, over time, the recorded sound waves has undergone the appropriate change in periodicity. For example, a thrushes vocalization start at a low frequency and end at a high frequency. Central processing unit 22 determines if a set of recorded sound wave period patterns correspond to the patterns of a thrush by determining if, over time, the signals have undergone the appropriate shortening of their period.

Step 188 may, of course, employ other processes to determine if the received sound is part of a vocalization of a species of interest. For instance, instead of evaluating the sound waves based on their periods, central processing unit 22 may initially calculate the frequency of each wave and then perform all the substitute pattern recognition comparisons. Alternatively, after the first sound wave is received, central processing unit 22 may rely on a series of pointers to determine if the subsequently received sound waves have periods that fall within the expected range of periods for the vocalizations of the species of interest. For the owl, this process involves determining if the subsequently received vocalizations have a period that remain constant over time. For the thrush, this process involves determining if, over time the periods of the vocalizations decrease. Other processes, such phoneme recognition processes can also be used to determine if the received sound waves correspond to the vocalizations of the species of interest.

If the sound wave evaluation step 188 determines the system 10 monitored the vocalizations of a species of interest, as represented by step 189, the system records an indication of the species, the time the vocalization occurred and an indication of from where the vocalization originated. This last piece of information is determined by obtaining an average angular direction for all the sound waves that were received by the system 10. This data is then available for retrieval by personnel who are monitoring the results of the survey. The system 10 then returns to listen for a new set of sound waves. This latter step is also performed if the central processing unit 22 determines that the sound waves do not correspond to the vocalization pattern of the species of interest.

The system 10 also displays the time and direction data for received sound waves that fall with the periodicity of the vocalizations of interest. As represented by step 190 this is done whether or not the central processing unit determines the vocalizations were made by a species of interest. For most applications, the period data is represented as frequency data. This enables personnel to recognize the species that emitted the vocalization in the event central processing unit 22 was unable to perform this task. In one preferred embodiment of the invention, a graph of angular direction over time is displayed immediately above the graph of frequency over time. These graphs have a common horizontal axis for time allowing wavelength data to be correlated with the associated angular direction data.

Figure 7:
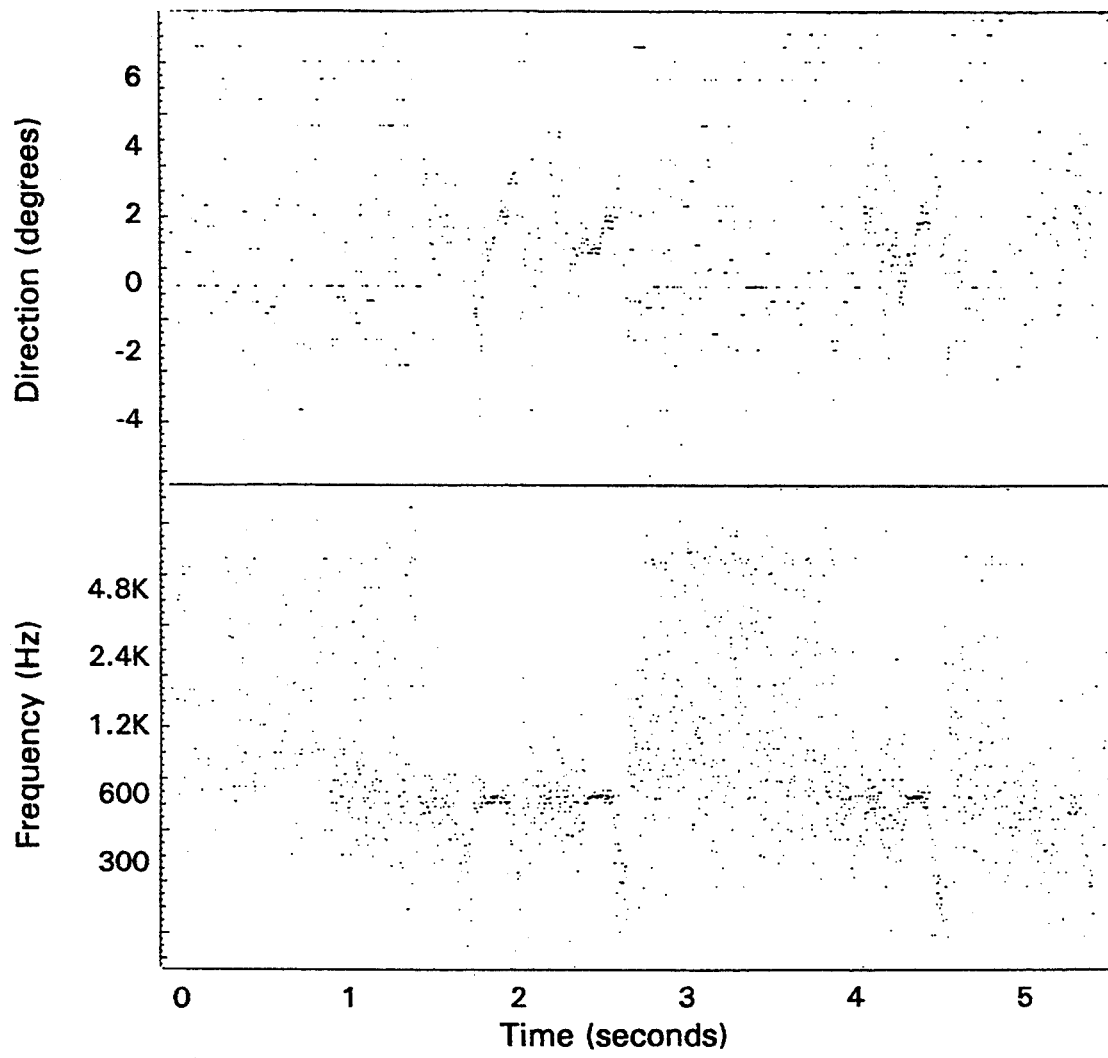
FIG. 7 is a representative view of a frequency profile and angular direction plot of a vocalization produced by the wildlife monitoring system of this invention.

FIG. 7, is a display of information produced by an embodiment of the invention which was pointed toward the vocalization of a spotted owl. The lower half of FIG. 7 shows three clusters of data of approximately 660 Hz. The frequency, duration, and spacing of these three clusters of data, together with information about the conditions under which the recording was made such as the geographic location, habitat, time of day, and season combine to provide evidence suggesting that these three clusters of data were produced by three hoots from a spotted owl. Located directly above these three clusters of 660 Hz are three clusters of angular direction data that indicating the owl was located approximately two degrees from reflector baseline when it emitted the vocalization.

System 10 of this invention gives researchers the ability to determine the location of a target species in a wildlife study area by providing an indication of its location when it vocalizes. When used to study multiple species, the system 10 will give an indicate of the species of animal that emitted the vocalization. Since the data developed by this system is automatically stored by the central processing unit 22, the system can be set up in a study area and left unattended for a period of time. Thus this system eliminates the need to have humans in the study area for extensive periods of time which can adversely affect the natural behavior of the wildlife. Moreover, since this system does not need to be continually tended, the overall cost of performing a survey using this system is relatively low. Still another feature of this invention is that EPROMs 122 and 177 can be quickly replaced to adjust for the vocalization characteristics of different species.

System 10 also provides a convenient means to study the behavior of a species within a study area without having to incur the time and expense that is often associated with having to capture individuals of the species being studied so that radio transmitters can be attached to their bodies. Furthermore, the system of this invention can be adjusted so that it only processes signals that have the wavelength characteristics of the vocalization of the species being monitored. Thus, the system of this invention can readily be adjusted to selectively monitor a particular species or a group of similar species.

Figure 8:
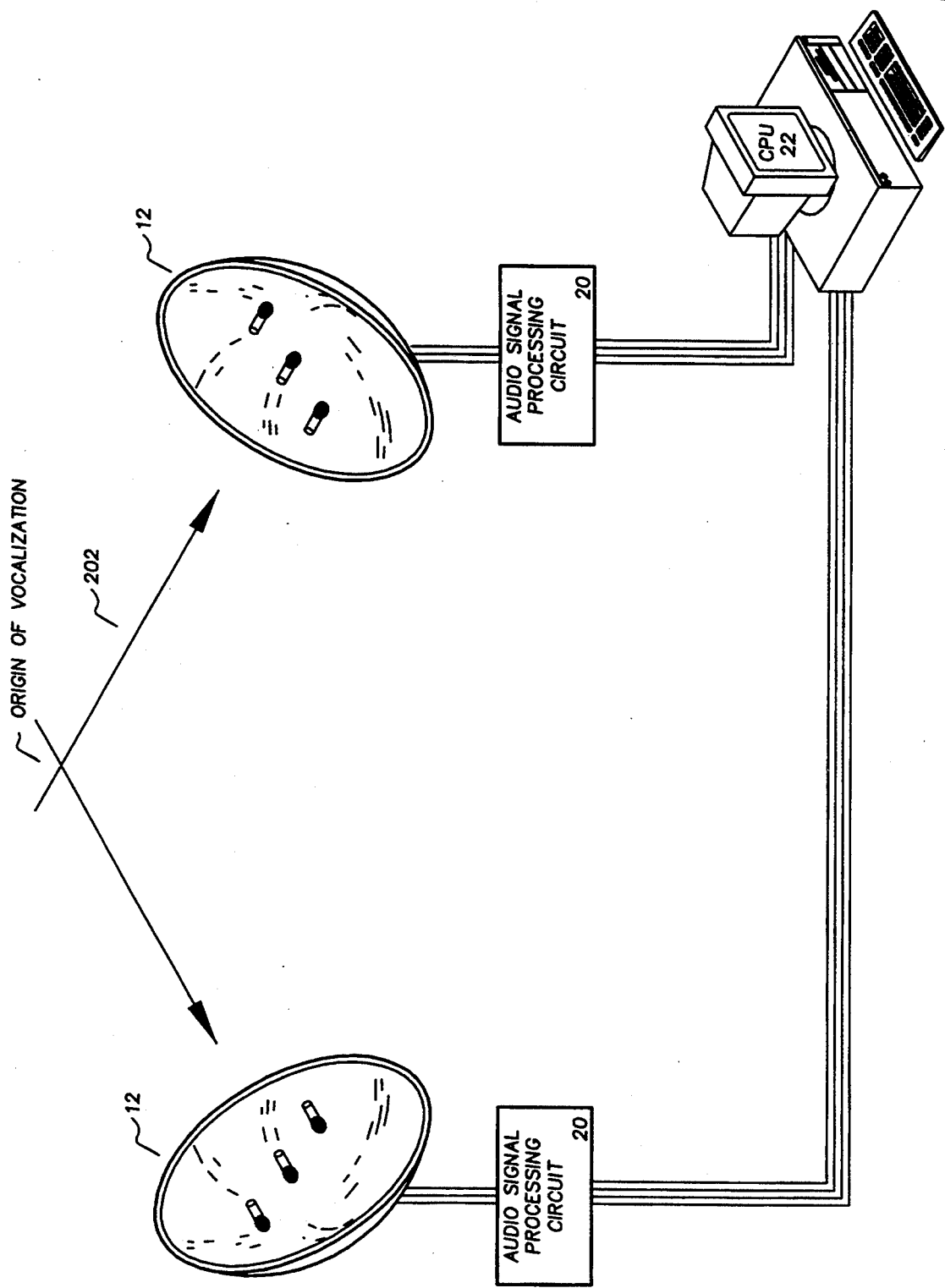
FIG. 8 illustrates an alternative wildlife monitoring system of this invention.

FIG. 8 illustrates an alternative version of the system 202 of this that is used to more precisely locate the position from which a vocalization originated. System 202 includes at least two sound receiving units 12 each of which is connected to an audio signal processing circuit 20 and that are directed to the selected survey area. The output signals of the individual audio signal processing circuits 20 are supplied to the central processing unit 22. Central processing unit 22 determines the angular direction from which the vocalization originated relative to each sound receiving unit 12. Central processing unit 22 then triangulates the exact location within the study area the origination of the vocalization based on the known locations of the sound receiving units 12 and the fact that the angular directions from which the vocalization originated relative to the reflector baselines of the sound receiving units 12 are also known.

As part of the process of determining the position of the target by triangulation, central processing unit 22 compares, or correlates, the pattern of the wavelengths of the vocalizations monitored by the sound receiving units to ensure that they are substantially identical for a given period of time. If the vocalization patterns are different, the central processing unit 22 does not perform the triangularization. The selective execution of the triangularization process is performed to ensure that the triangularization is performed on a vocalization emitted by a single target as opposed to multiple vocalizations emitted simultaneously by separate targets.

Figure 9:
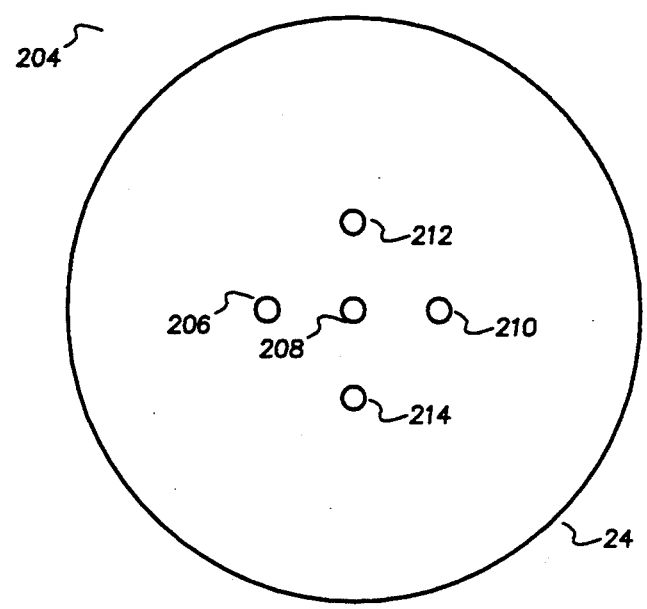
FIG. 9 illustrates an alternative sound receiving unit that can be employed with the wildlife monitoring system of this invention.

FIG. 9 illustrates an alternative sound receiving unit 204 that can be employed with the wildlife monitoring system of this invention. Sound receiving unit 204 comprises a set of horizontally aligned microphones 206, 208, and 210 mounted on a parabolic reflector 24 as described with respect to the first embodiment of the invention. The sound receiving unit 204 also includes an upper microphone 212 and a lower microphone 214 that are vertically spaced above and below and linearly aligned with the center microphone 208. Upper microphone 212 and lower microphone 214 are, in conjunction with center microphone 208 coupled to a pair of subtractor circuits similar to subtractor circuits 70 and 72 in order to produce a C-Upr signal representative of the difference in vocalization signal strength between the center microphone 208 and the upper microphone 212 and a C-Lwr signal representative of the signal strength between the center microphone 208 and the lower microphone 214. The C-Upr and C-Lwr signals are processed in a manner identical to that used to process the C-R and C-L signals and are applied to a EPROM look-up table similar to table 120 which provides the angular direction relative to the horizontal axis. Thus, sound receiving unit 204 can be used to provide a vector indicating both the horizontal and vertical angular directions from which the vocalization originated.

Sound receiving unit 204 can be employed with system 202 of this invention to further insure that the system triangulates the location of the origin of vocalizations of a single target. It is of course understood that in this version of the invention, the individual audio signal processing circuits 215 are modified versions of audio signal processing circuit 20 that are constructed to generate angular direction signals that indicate both the left-right and up-down angular direction from which the monitored vocalization originated.

Figure 10:
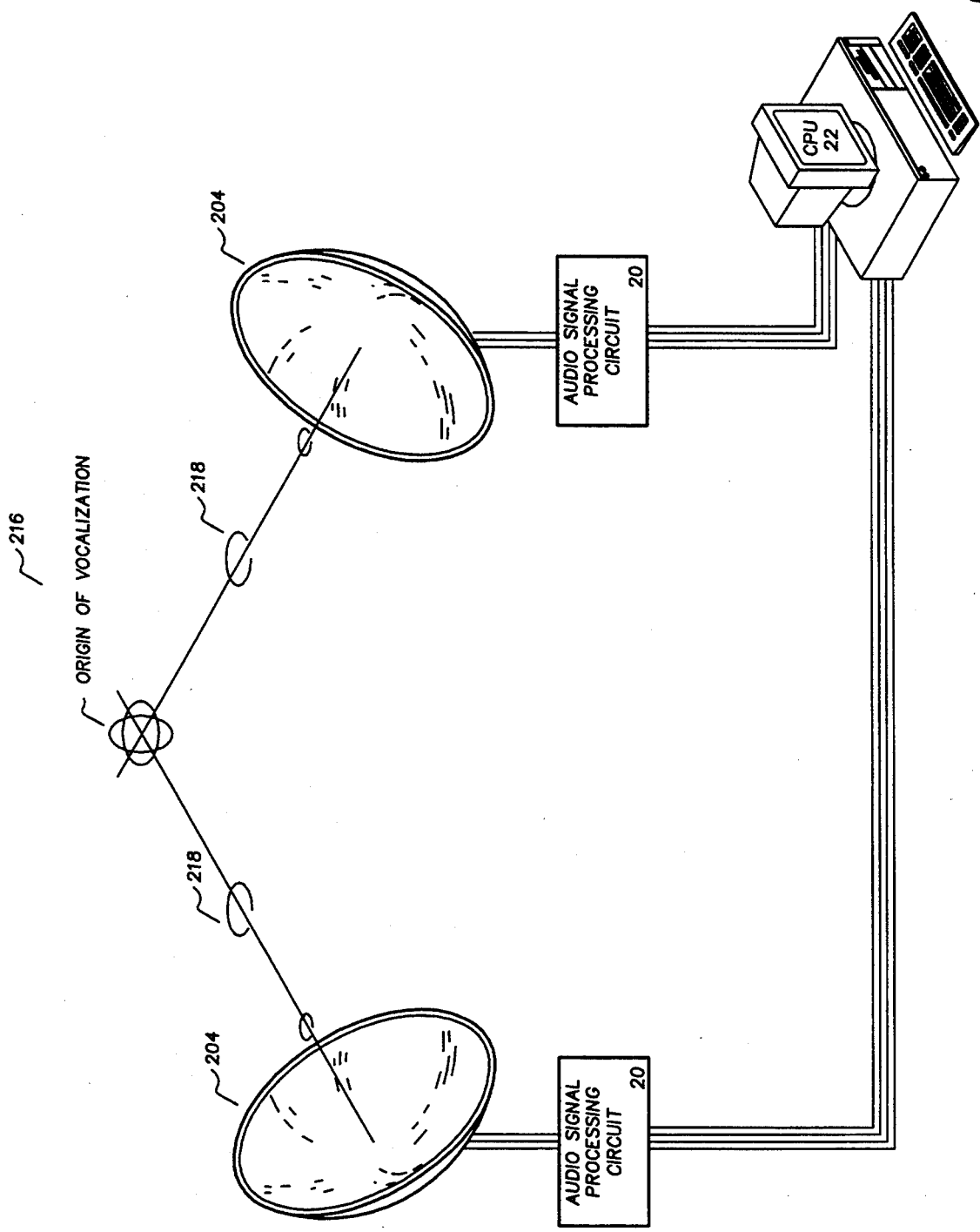
FIG. 10 diagrammatically illustrates how the sound receiving unit of FIG. 9 can be incorporated into the wildlife monitoring system of FIG. 8.

As shown diagrammatically by FIG. 10, when sound receiving unit 204 is integral with system 216, the system generates vectors indicating the vertical and horizontal locations from which a vocalization originated. The central processing unit 22 then accepts as valid the triangulated location for the location of the target only if the location is within a given acceptance radius 218 from the vectors. As seen in this Figure, the acceptance radii 218 expand along the length of the vectors relative to the sound receiving units 204 to reflect increasing tolerances for the position of the target generating the vocalization at greater distances from the sound receiving units 204. An advantage of this feature of the invention is that it offers a test that prevents the false identification of the location from which the vocalization originated.

Figure 11:
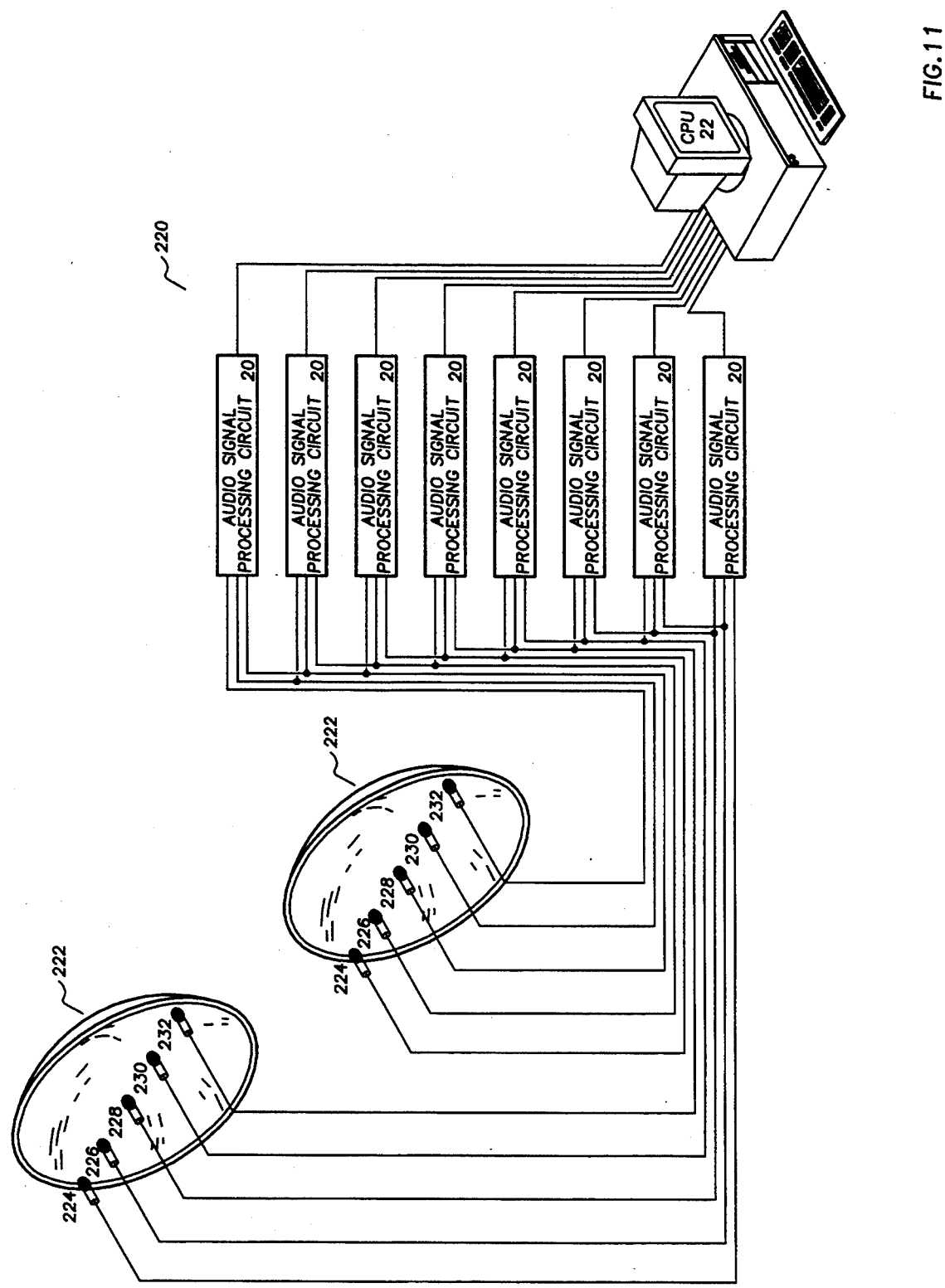
FIG. 11 illustrates an alternative wildlife monitoring system of this invention.

An alternative system 220 of this invention that can be placed in the center of a wildlife survey area is illustrated by FIG. 11. System 220 includes five separate sound receiving units 222 that are arranged in a circular pattern. Each sound receiving unit includes five linearly arranged microphones 224–232. Specifically, there is an outer left microphone 224, an inner left microphone 226, a center microphone 228 that is located at the focal point of the associated sound receiving unit 222, an inner right microphone 230, and an outer right microphone 232.

The sounds monitored by the individual microphones 224–232 are forwarded to an audio signal processing circuit 234 which is similar in general structure and function to audio signal processing circuit 20. More specifically, audio signal processing circuit 234 includes a set of subtractor circuits 70 (FIG. 1) that enable the circuit 234 to produce subtractive signals representative of the relative signal strengths of any five adjacent microphones even if the microphones are not all integrally associated with the same sound receiving unit 222. Thus, audio signal processing circuit 234 is, for example, capable of producing a first subtractive signal representative of the relative signal strength between an inner left microphone 226 and the adjacent outer left microphone 224, a second subtractive signal representative of the relative signal strength between the outer left microphone 224 and the outer right microphone 232 of the adjacent sound receiving unit, a third subtractive signal representative of the relative signal strength between the outer right microphone 232 and the adjacent inner right microphone 230, and a fourth subtractive signal representative of the relative signal strength between the inner right microphone 230 and the adjacent center microphone 230.

In some versions of the invention the multiple subtractive signals are provided by coupling each two adjacent microphones 224–232 to a subtractor circuit 70. In other versions of the invention, the output signals from the microphones are all applied to a set of voltage monitors, and based on the monitored voltage levels, the signals from the five adjacent microphones from which the strongest signals were received are applied to a set of four subtractor circuits.

System 220 uses the four subtractive signals as a basis for determining from which angular direction relative to the center of the array of sound receiving units 222 the vocalizations were received. In some versions of this invention the subtractive signals after digitized are applied to a set of look-up tables integral with the audio signal processing circuit 222 similar to the previously described look-up table 120. In still other versions of the invention, the digitized subtractive signals are applied directly to the central processing unit 22. The central processing unit 22 then, by reference to a set of internal look-up tables stored in its memory, generates an indication of the angular direction from which the vocalizations originated.

An advantage of system 220 of this invention is that it provides a means for determining the direction from which the vocalization originated over a relatively wide angular area. This minimizes the number of reflector sites that have to be set up and periodically tended for given survey area Still another advantage of system 220 is that four subtractive signals enable the system to generate an indication of the angular direction of from where the vocalization originated to a high degree of resolution.

The foregoing description is limited to several preferred embodiments of the invention. It should be clear however, that the structure of the invention may differ from what has been described and illustrated. For example, sound receiving unit 222 with the five microphones 224–232 can be used as a stand-alone sound receiving unit to provide a set of subtractive signals from which angular direction from which the received vocalization originated can be calculated. In other versions of the invention seven or more linearly aligned microphones may be used to provide six or more subtractive signals for calculating angular direction of origination of the monitored vocalization. In these versions of the invention the associated audio signal processing circuit would be configured to determine the angular direction of the received vocalizations using as the "center" microphone the microphone from which the strongest signal was received. An additional advantage of this version of the invention is that it increases both the size of the study area that can be monitored using a single sound receiving unit. Also, by providing a large number of closely spaced microphones, the system can be configured to generate angular direction information regarding the received vocalization signals that have a very high degree of resolution.

Also, the structure of the electronic components used to produce the requisite signals may differ significantly from the structure of the described circuits. The processing steps performed in order to determine the location from which the monitored vocalizations originated may similarly be different than from what has been described. For example, in some versions of the invention it may be desirable to expand look-up table 120 to allow calibration of the angular direction based on signal strength, in a fashion similar to what has been described for calibration based on signal frequency. Alternatively, in some versions of the invention the look-up table 120 may be eliminated and replaced by a set of algorithms to determine the angular direction to the source of vocalizations based on the relative signal strengths and frequency. It may also be possible in some version of the invention to eliminate the need to perform phase comparisons between the subtracted signals prior to determining the angular direction to the vocalizations.

In some versions of the invention it may be further be desirable to mount the sound receiving unit 12 on computer driven rotating base. This could allow coverage of a larger study area with fewer microphones and receiving units. Computer control of the orientation of the sound receiving unit 12 could also allow the invention to respond to detections of target vocalizations by orienting the sound receiving unit 12 toward the vocalizations for the purpose of tracking of moving targets.

Thus, it should be recognized that it is the object of the appended claims to cover all such variations and modifications to come within the true spirit and scope of the invention.

I claim:

1. A system for monitoring the location of a wildlife target that vocalizes, the vocalizations of the target being within a selected range of frequencies, said system comprising:

a sound receiving unit for receiving the vocalizations from the target, said sound receiving unit including a parabolic reflector having a focal point, a center microphone mounted to said parabolic reflector and located at said reflector focal point, a first offset microphone mounted to said parabolic reflector, and a second offset microphone mounted to said parabolic reflector, said first and second offset microphones being mounted to said parabolic reflector at diametrically opposite positions relative to said center microphone;

an audio signal processing circuit connected to said center microphone and said first and second offset microphones including a first subtractive signal representative of the difference in signal strength between the vocalizations monitored by said center microphone and said first offset microphone, a second subtractive circuit that produces a second subtractive signal representative of the difference in signal strength between the vocalizations monitored by said center microphone and said second offset microphone, and a vocalization signal based on the period of the vocalizations monitored by said center microphone;

an angular detection circuit connected to said audio signal processing circuit for receiving said subtractive signals that, in response to receiving said subtractive signals, generates an angular direction signal representative of the directions from which the received vocalizations originated relative to said sound receiving unit; and a central processing unit connected to said audio signal processing circuit for receiving said vocalization signals and to said angular detection circuit for receiving said angular direction signal, said central processing unit, in response to receiving said vocalization signals and said angular direction signal determines the frequencies of the vocalization, and generating a frequency profile of the vocalization emitted by the target, said frequency profile including an indication of the angular direction relative to said sound receiving unit from which the vocalization was received.

2. The wildlife monitoring system of claim 1, wherein said audio signal processing unit includes at least one bandpass filter for filtering said sound signals monitored by said microphones, said bandpass filter being configured to selectively pass audio signals within a first range of frequencies of the vocalizations being monitored.

3. The wildlife monitoring system of claim 1, wherein said angular direction circuit includes a look-up table with a plurality of addressable memory locations, each said addressable memory location containing an angular direction value, and said angular direction circuit applies each pair of said first and second subtractive signals to said look-up table as memory address and retrieves said angular direction value stored at said memory address to function as said angular direction signal.

4. The wildlife monitoring system of claim 1, wherein said angular direction circuit includes:

a first look-up table with a plurality of addressable memory locations, said addressable memory locations in said first look-up table containing an initial angular direction values, and a second look-up table with a plurality of addressable memory locations, said addressable memory locations in said second look-up table containing adjusted angular direction values; and said angular direction circuit applies each pair of said first and second subtractive signals to said look-up table-as a first memory address and retrieves said angular direction value stored at said first memory address to function as an initial angular direction signal, and said angular direction circuit applies each said initial angular direction signal and said vocalization signal to said second look-up table as a second memory address and retrieves said adjusted angular direction value stored at said second memory address to function as said angular direction signal.

5. The wildlife monitoring system of claim 4 wherein said angular detection circuit is integral with said audio signal processing circuit.

6. The wildlife monitoring system of claim 1 further including a phase comparitor integral with said audio signal processing circuit for monitoring the relative phases of said first and second subtractive signals, said phase comparator generating an out-of-signal as said vocalization signal when said subtractive signals are substantially out-of-phase; and, wherein said central processing unit, upon receiving said out-of-phase signal as said vocalization signal discards said angular direction signal received with said vocalization signal.

7. The wildlife monitoring system of claim 4 further including a phase comparitor integral with said audio signal processing circuit for monitoring the relative phases of said first and second subtractive signals, said phase comparator generating an out-of-signal as said vocalization signals when said subtractive signals are substantially out-of-phase; and, wherein said central processing unit, upon receiving said out-of-phase signal as said vocalization signal discards said vocalization signal and said angular direction signal received with said vocalization signal.

8. The wildlife monitoring system of claim 2 wherein said central processing unit includes at least one template of a frequency profile for a species of interest and said central processing unit compares said vocalization signal of the target vocalizations received by said sound receiving unit to determine if the vocalizations are within the frequency profile of the species of interest, and, if the vocalizations are within the frequency profile of the species of interest, said central processing unit uses said vocalization signals to produce said frequency profile of the vocalizations.

9. The wildlife monitoring system of claim 1, wherein said central processing unit includes at least one template of a frequency profile for a species of interest and, said central processing unit compares said vocalization signal to said template to determine if the received target vocalization are from the species of interest.

10. The wildlife monitoring system of claim 4, wherein said central processing unit includes at least one template of a frequency profile for a species of interest and, said central processing unit compares said vocalization signal to said template to determine if the received target vocalizations are from the species of interest.

11. The wildlife monitoring system of claim 1, wherein:

said sound receiving unit includes at least five linearly aligned microphones one of said microphones being said center microphone located at the reflector focal point, the remaining said microphones being diametrically positioned on opposite sides of said center microphone;

said audio signal processing circuit includes at least four subtractor circuits connected to said microphones for producing a plurality of subtractive signals, each said subtractive signal being representative of the difference in signal strength between the vocalizations monitored by two adjacent said microphones; and said angular detection circuit is connected to said audio signal processing circuit for receiving said subtractive signals, said angular detection circuit being configured to produce said angular direction signal based on said subtractive signals.

12. A system for monitoring a given geographic area for a wildlife target from a species that vocalizes, the vocalizations of the species occurring within a specific range of frequencies and having a specific frequency profile, said system comprising:

at least two sound receiving units for receiving vocalizations from the target, each said sound receiving unit including a parabolic reflector having a focal point, a center microphone mounted to said parabolic reflector and located at said reflector focal point, a first offset microphone mounted to said parabolic reflector, and a second offset microphone mounted to said parabolic reflector, said first and second offset microphones being mounted to said parabolic reflector at diametrically opposite positions relative to said center microphone;

an audio signal processing circuit, each said audio signal processing circuit being connected to said center microphone and said first and second offset microphones for producing for each sound receiving unit a first subtractive signal representative of the difference in signal strength between the vocalizations monitored by said center microphone and said first offset microphone, a second subtractive signal representative of the difference in signal strength between the vocalizations monitored by said center microphone and said second offset microphone, and a vocalization signal based on the period of the vocalizations monitored by said center microphone;

an angular detection circuit connected to each said audio signal processing circuit for receiving said subtractive signals that, in response to receiving said subtractive signals, generates an angular direction signal for each said sound reflector representative of the directions from which the received vocalizations originated relative to said sound receiving unit; and a central processing unit connected to said audio processing circuits for receiving said vocalization signals and to said angular detection circuit for receiving said angular direction signals, said central processing unit upon receiving said angular direction signals for said at least two sound receiving units determines the geographic location from which the vocalization originated.

13. The wildlife monitoring system of claim 12, wherein said central processing unit determines a frequency profile for said vocalization signals received by said at least two sound receiving units and if said processor unit determines said vocalization frequency profiles for substantially identical, said central processing unit proceeds to determine the geographic location from which the vocalization signals originated.

14. The wildlife monitoring system of claim 12, wherein:

each said sound receiving unit further includes a third offset microphone attached to said reflector and located between said center microphone and said reflector outer edge and a fourth offset microphone attached to said reflector between said center microphone and said reflector outer edge, said third and fourth offset microphones being located on opposite sides of said center microphone and linearly aligned with each other and said center microphone so as to be linearly offset with the alignment of said first and second offset microphones;

each said audio signal processing circuit is further connected to said third and fourth offset microphones of said sound receiving unit with which said processing circuit is associated and each said processing circuit further includes a third subtractor circuit for producing a third subtractive signal connected to said third offset microphone and said center microphone for producing a third subtractive signal representative of the difference in received signal strength between said center microphone and said third offset microphone and said center microphone and a fourth subtractor circuit for producing a fourth subtractive signal representative of the difference in received signal strength between said fourth microphone and said center microphone;

each said angular detection circuit receives is connected to said audio signal processing circuit associated therewith for receiving said first, second, third, and fourth subtractive signals, and in response to receiving said subtractive signals generates a vector indicating the vertical and horizontal directions from which the vocalization monitored by said sound record units originate; and said central processing unit receives said vectors from said angular detection circuits and, determines the geographic origin of the vocalization based on said vectors.

15. The wildlife monitoring system of claim 14, wherein said central processing unit accepts said calculated geographic origin of said vocalizations as a true indication of the geographic origin of the vocalization if said calculated geographic origin is within a specific distance of said vectors from which said calculated geographic origin is determined.

16. A method of monitoring wildlife to determine the species and location of a wildlife target in a study area by listening to the vocalization produced by the target, including the steps of:

monitoring the vocalization produced by the target with a sound receiving unit, said sound receiving unit including a parabolic reflector having a focal point, a center microphone mounted to said parabolic reflector and located at said reflector focal point, a first offset microphone mounted to said parabolic reflector, and a second offset microphone mounted to said parabolic reflector, said first and second offset microphones being mounted to said parabolic reflector at diametrically opposite positions relative to said center microphone;

generating a first subtractive signal representative of a difference in received vocalization signal strength between said first offset microphone and said center microphone and generating a second subtractive signal representative of a difference in received signal strength between said second offset microphone and said second offset microphone and said center microphone;

determining the angular direction from which the vocalization was emitted relative to said sound receiving unit by reference to the relative magnitudes of said first and second subtractive signals;

generating a frequency profile of the vocalization monitored by said sound receiving unit; and comparing said generated frequency profile of the received vocalization to a preestablished vocalization frequency profile of the target species and generating an indication of the species presence when the received target vocalization substantially matches said preestablished vocalization profile, said species presence indication including an indication of the angular direction of the target relative to said sound receiving unit when it emitted the vocalization.

17. The method of wildlife monitoring of claim 16 further including the steps of:
- determining the phase relationship between said first and second subtractive signals; and
- calculating said angular direction from which the vocalization originated when said first and second subtractive signals have a specific phase relationship.

18. The method of wildlife monitoring of claim 16, wherein said step of determining the angular direction form which the vocalizations originated includes the steps of:
- converting said subtractive signals into a specific memory address; and
- retrieving from an addressable memory unit an indication of the angular direction from which said vocalizations originated, said addressable memory unit containing a plurality of addressable memory locations, each said memory location containing an angular direction value, said retrieving step including the step of using said subtractive signals-based specific memory address as the address in said memory unit from which said angular direction value is retrieved.

19. The method of wildlife monitoring of claim 16, further including the step of determining the angular direction of from where the target vocalization originated based on the frequency of the vocalization.

20. The method of wildlife monitoring of claim 19, wherein said step of determining the angular direction from which the vocalizations originated includes the steps of:
- converting said subtractive signals into a first memory unit address;
- retrieving from an first addressable memory unit an initial indication of the angular direction from which said vocalizations originated, said first addressable memory unit containing a plurality of addressable memory locations, each said memory location containing an initial angular direction value, said retrieving step including the step of using said subtractive signals-based specific memory address as the address in said memory unit from which the initial angular direction value is retrieved;
- generating a vocalization signal representative of the frequency of the received target vocalization;
- combining said vocalization signal and said initial angular direction signals to produce a second memory unit address;
- retrieving from a second addressable memory unit the indication of the angular direction from which said vocalizations originated, said second addressable memory unit containing a plurality of addressable memory locations, each said memory location containing an adjusted angular direction value, said retrieving step including the step of using said second memory unit address as the address in said memory unit from which the angular direction value is retrieved.

21. The method of wildlife monitoring of claim 20, further including the steps of:
- determining the phase relationship between said first and second subtractive signals; and
- calculating said angular direction from which the vocalization originated when said first and second subtractive signals have a specific phase relationship.

* * * * *